E. HARRIS.
RETREAD VULCANIZER.
APPLICATION FILED FEB. 8, 1919.
1,353,042.
Patented Sept. 14, 1920.
4 SHEETS—SHEET 4.
FIG. 4.
FIG. 5.
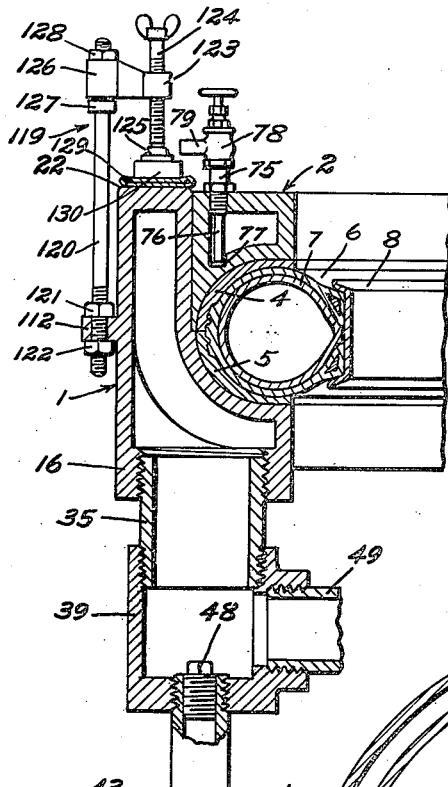
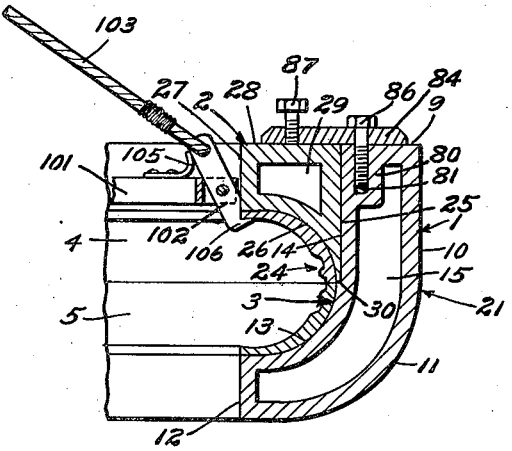
FIG. 6.
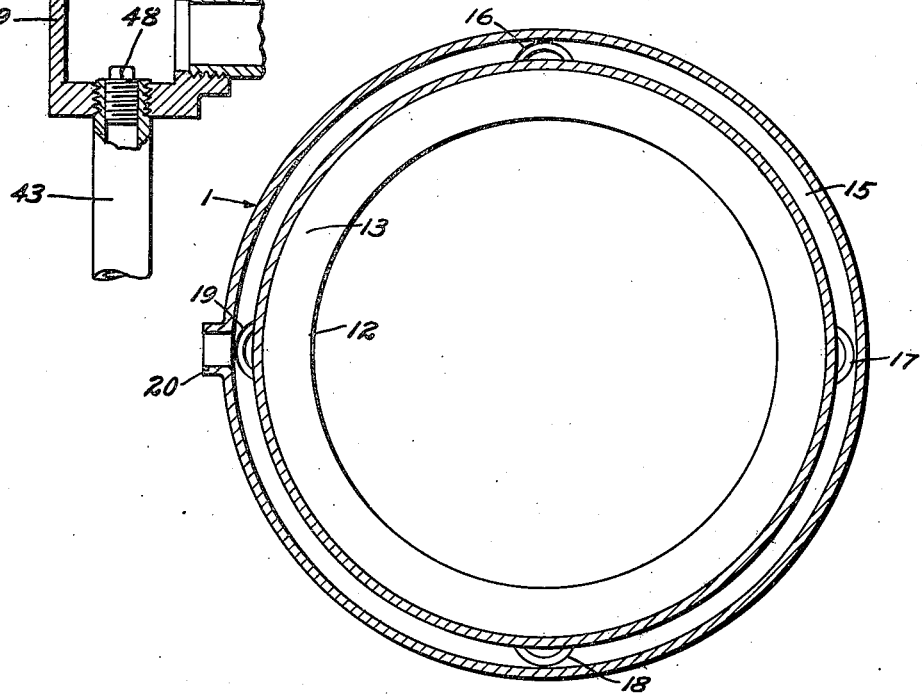
INVENTOR
EDWARD HARRIS
BY Hazard & Miller
ATT'YS.

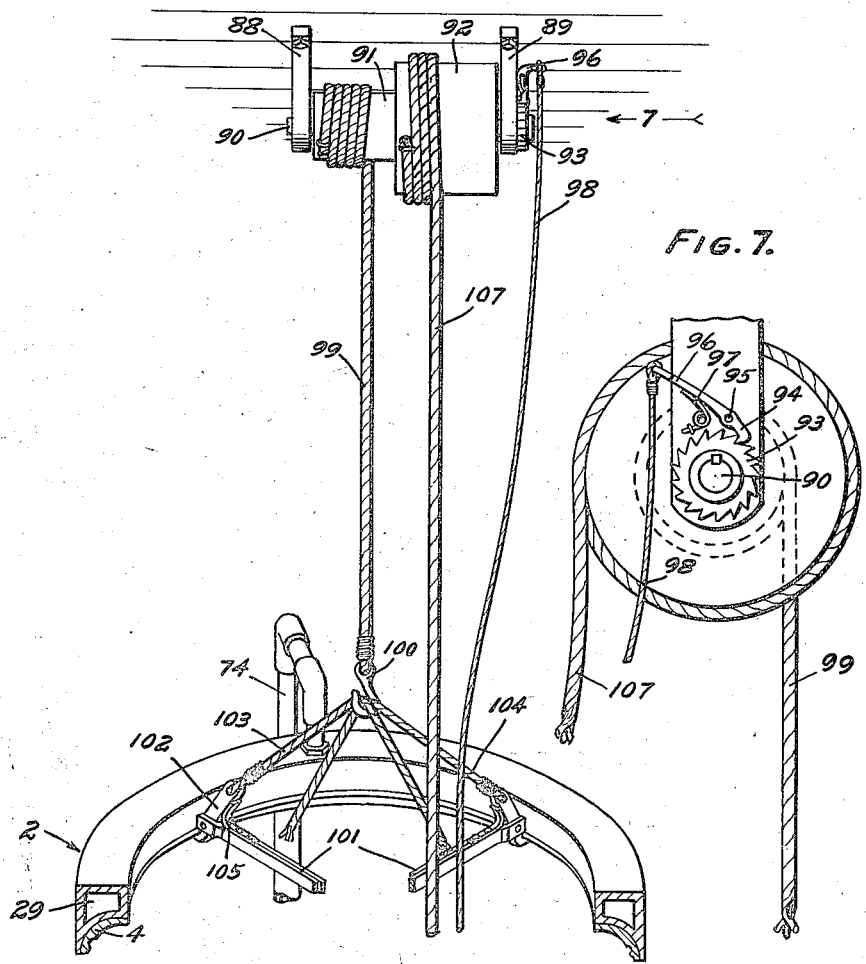

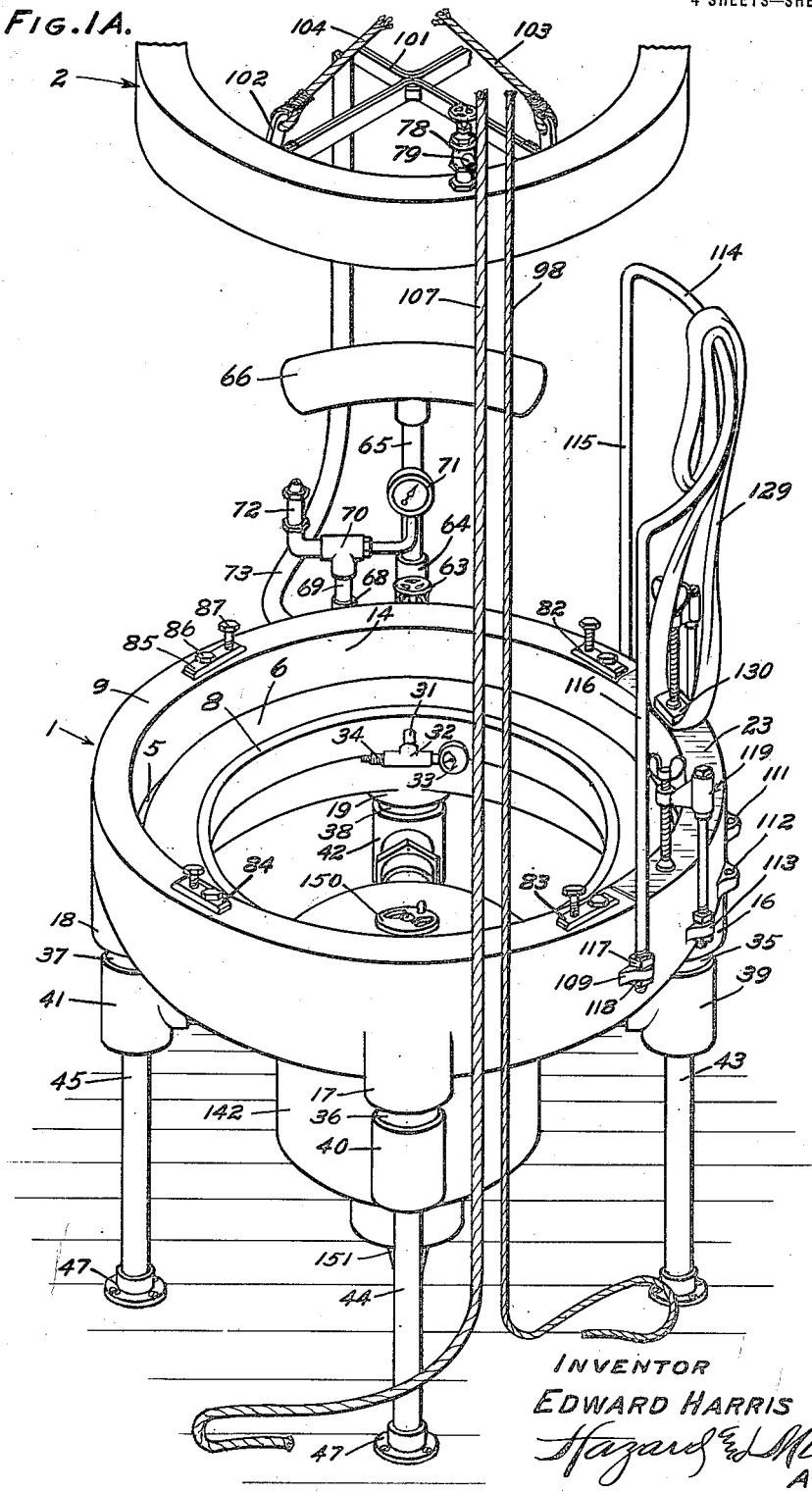

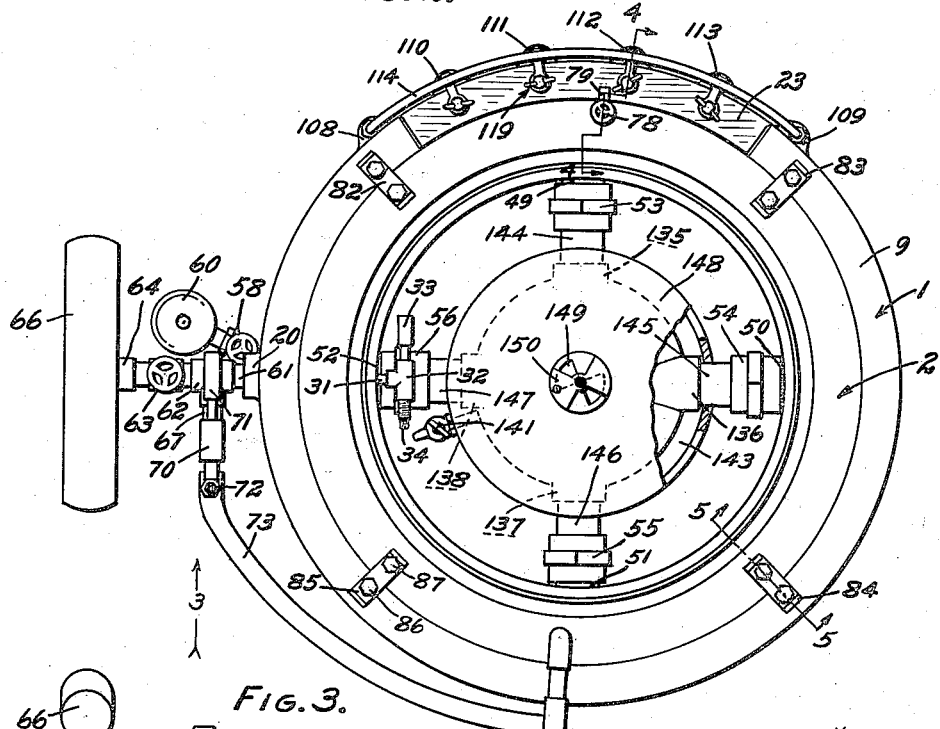
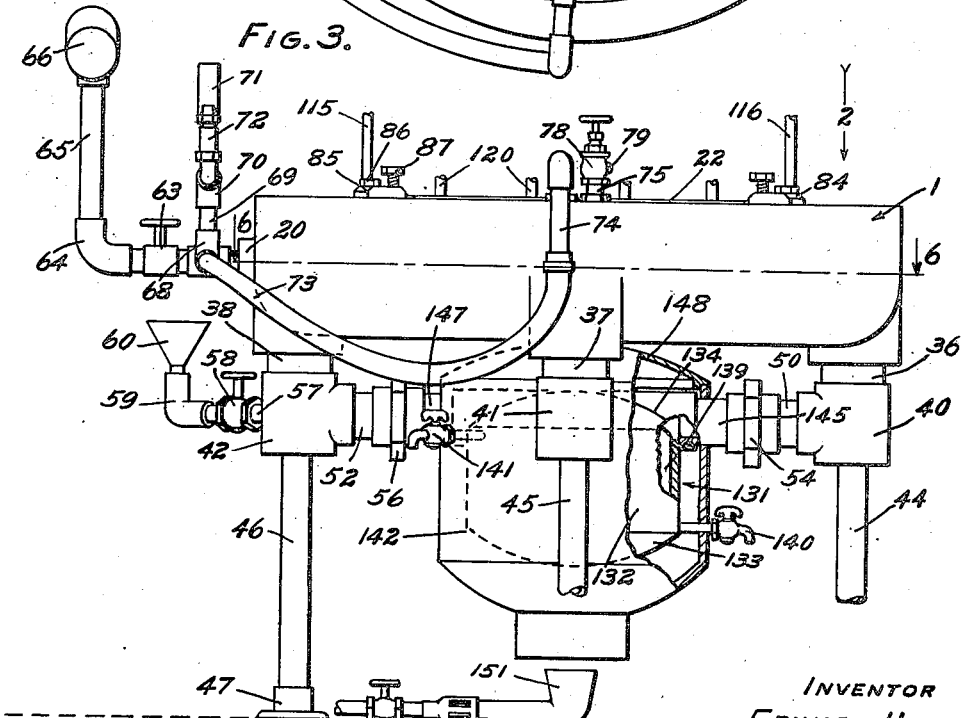

UNITED STATES PATENT OFFICE.

EDWARD HARRIS, OF LOS ANGELES, CALIFORNIA.

RETREAD-VULCANIZER.

1,353,042.  Specification of Letters Patent.  Patented Sept. 14, 1920.

Application filed February 8, 1919. Serial No. 275,896.

*To all whom it may concern:*

Be it known that I, EDWARD HARRIS, a citizen of the United States, residing at Los Angeles, in the county of Los Angeles and State of California, have invented new and useful Improvements in Retread-Vulcanizers, of which the following is a specification.

My invention relates to retread vulcanizers and consists of the novel features herein shown, described and claimed.

The principal object of my invention is to make a practical mold in which a complete retread may be cured at a single operation and by the dry curing process so that the beads will not be injured or affected by the retread operation.

Another object of my invention is to make a vulcanizer in which the casting forming a part of the vulcanizer mold serves as a tube plate.

Another object of my invention is to make a retread vulcanizer in which the tire may be supplied with an inner tube and mounted upon a rim and placed in the mold and the inner tube inflated to give the necessary pressure to form the retread, thereby eliminating the use of a sand bag and compression screws.

Figure 1 and Fig. 1ᴬ together constitute a perspective of a retread vulcanizer embodying the principles of my invention, the parts being shown in operation with the movable section of the mold elevated as required to remove or insert the tire.

Fig. 2 is a top plan view of the mold with the parts in place as in curing a tire, the view being taken looking in the direction indicated by the arrow 2 in Fig. 3.

Fig. 3 is a side elevation looking in the direction indicated by the arrow 3 in Fig. 2, the tube plate rack and clamps being broken away to economize space.

Fig. 4 is a vertical cross sectional detail upon an enlarged scale, and taken on the line 4—4 of Fig. 2.

Fig. 5 is a vertical cross sectional detail on the line 5—5 of Fig. 2.

Fig. 6 is a horizontal section through the stationary mold section and on the line 6—6 of Fig. 3, with the other parts omitted.

Fig. 7 is an enlarged fragmentary side elevation of the lifting mechanism for operating the removable mold section, the view being taken looking in the direction indicated by the arrow 7 in Fig. 1.

Referring first to Figs. 4, 5 and 6, the stationary mold section 1 and the movable mold section 2 together form a continuous tire cavity 3. Matrix sections 4 and 5 are mounted in the cavity 3, the tire 6 fits the matrix, the inner tube 7 is placed in the tire 6 and then the tire 6 is placed upon the rim 8, and then the tire 6 is placed in the mold.

The stationary mold section 1 is a casting annular in plan and having a flat upper face 9, a substantially straight outer face 10, a curved lower face 11, a straight lower inner face 12, a curved inner face 13 substantially concentric to the curved face 11, and the straight inner face 14 substantially parallel with the straight outer face 10. The casting is cored to form a steam chamber 15, and the metal around the steam chamber is substantially of an even thickness. The faces 13 and 14 are machined, otherwise the bulk of the casting is rough or unfinished. The wall of the casting around the steam chamber 15 is preferably about one-half inch thick. Bosses are applied to the pattern, and the core box is arranged to produce female pipe nipples 16, 17, 18 and 19 extending downwardly from the bottom of the steam chamber 15, said pipe nipples being arranged radially and evenly spaced apart. A fifth female pipe nipple 20 extends horizontally at the level of the parting line of the mold in which the casting is formed, said parting line being at the point 21 where the straight face 10 joins with the curved face 11.

A pad is placed upon the pattern to produce the raised portion 22, and this raised portion 22 is finished upon its upper face to produce the tube plate 23. The matrix sections 4 and 5 are mates and fit closely in the cavity 3 and closely together to form the non-skid tread mold 24. The matrix section 5 is placed in the cavity 3, then the tire 6 carrying the inner tube 7 and the rim 8 is inserted downwardly into the matrix section 5, then the matrix section 4 is inserted downwardly upon the tire. The movable mold section 2 may, or may not be handled with the matrix section 4. The movable mold section 2 is an annular ring having a straight outer face 25 accurately machined and fitting the straight inner face 14, a curved lower face 26 matching the curved face 13 and fitting the matrix section 4, the straight inner face 27 matching the straight face 12, and the flat upper face 28 on a level with the flat face 9. A steam chamber 29 is formed in the movable mold section 2, the metal around the steam chamber being preferably half an inch thick and of an even thickness throughout. Preferably a shoulder 30 is formed at the junction of the curved face 13 and the straight face 14, and the movable mold section 2 fits upon this shoulder 30. The face 25 is small enough to allow the movable mold section to pass into and out of place, and the curved face 26 is accurately machined to fit the outer face of the matrix section 4 otherwise the movable mold section 2 is unmachined.

Referring to Fig. 1<sup>A</sup>, the air valve stem 31 extends from the inner tube through the rim 8, a T 32 is placed upon the air valve stem 31, a pressure gage 33 is connected to one end of the T, and the air inlet valve 34 is connected to the other end of the T, so that when the hose fitting is applied to the air inlet valve 34 and the inner tube inflated the pressure in the inner tube will be indicated upon the gage 33. Pipe nipples 35, 36, 37 and 38 are screwed into the nipples 16, 17, 18 and 19, T's 39, 40, 41 and 42 are screwed on to the pipe nipples. Legs 43, 44, 45 and 46 are screwed into the T's, and a floor flange 47 is screwed upon the lower end of each leg. The legs 43, 44, 45 and 46 are preferably made of pipe, and a plug 48 is tapped into the upper end of each piece of pipe, as shown in Figs. 3 and 4, to prevent steam and water from running down the legs. The legs are of equal lengths so as to mount the stationary mold section 1 with its upper face 9 substantially on a horizontal plane. Pipe nipples 49, 50, 51 and 52 are screwed into the side outlets of the T's 39, 40, 41 and 42, and unions 53, 54, 55 and 56 are screwed upon the nipples. A nipple 57 is tapped into the T 42, a valve 58 is screwed upon the nipple 57, an elbow 59 is connected to the valve 58, and a filling funnel 60 is connected to the elbow 59, so that the valve 58 may be opened and water poured into the funnel 60, and so that when the valve 58 is closed the water and steam pressure will be held.

A pipe nipple 61 is tapped into the female nipple 20, a T 62 is screwed upon the nipple 61, a valve 63 is connected to one outlet of the T 62, an elbow 64 is connected to the valve 63, a pipe 65 extends upwardly from the elbow 64, and an inside cure mold 66 is mounted upon the upper end of the pipe 65, so that when desired the valve 63 may be opened and the mold 66 heated. A pipe nipple 67 is screwed into the side outlet of the T 62, a T 68 is connected to the pipe nipple 67, the pipe nipple 69 extends upwardly from the T 68, a T 70 is screwed upon the upper end of the nipple 69, a pressure gage 71 is connected to one end of the T, and a blow-off 72 is connected to the other end of the T. A steam hose 73 is connected to the T 68 at one end, and the other end of the hose is connected to a combination of pipe fittings 74 leading to the steam chamber 29 in the movable mold section 2, the hose 73 being of considerable length so as to allow the movable section 2 to move up and down.

A pipe fitting 75 is tapped through the upper wall of the movable mold section 2 into the steam chamber 29. A sump pipe 76 leads from the pipe fitting 75 to near the bottom of the well 77, said well 77 being below the steam chamber 29, so that the condensation of the steam chamber 29 will flow into the well 77. A valve 78 is connected to the fitting 75, and a nozzle 79 is connected to the valve, so that when the steam pressure is on and the valve 78 is opened the steam pressure will blow the water from the well 77 out from the sump pipe 76 through the valve and through the nozzle 79. If desired, a hose may be attached to the nozzle 79 to carry the water away to any desired point.

Blocks are inserted into the core box to form bosses 80 in the steam chamber 15, and holes 81 are bored and tapped from the face 9 into the bosses 80. Buttons 82, 83, 84 and 85 are placed upon the face 9, and a cap screw 86 is inserted downwardly through each button and screwed into the openings 81, so that the buttons may be turned in radial planes, as shown in Fig. 2, and hold the movable mold section 2 down upon the shoulder 30. A set screw 87 is tapped through the swinging end of each button, so that when the buttons have been turned over the movable mold section 2, the set screws may be tightened to press the movable mold section firmly into place, and so that when the set screws are loosened the buttons will swing freely out of the way to allow the movable mold section 2 to be raised.

Referring to Fig. 1, shaft hangers 88 and 89 are screwed to the ceiling, a shaft 90 is mounted in the shaft hangers, a lifting pulley 91 is fixed upon the shaft 90, an operating pulley 92 is fixed upon the shaft 90 beside the lifting pulley 91, a ratchet wheel 93 is fixed upon the outer end of the shaft 90, and a pawl 94 is pivotally connected to the hanger 89 by a pivot 95 and in position to engage the ratchet wheel 93. An arm 96 extends from the pawl 94, a spring 97 engages the arm 96 to hold the pawl 94 in engagement with the ratchet wheel, and an operating cord 98 is connected to the outer end of the arm 96 and extends downwardly to the floor. A cable 99 is attached at its upper end to the pulley 91 and wound upon the pulley and extends downwardly and has a hook 100 at its lower end. A four-armed spider 101 fits loosely within the face 27 of the movable mold section 2. Hooks 102 are pivotally connected to the ends of the arms of the spider 101, cables 103 and 104 connect the hooks in pairs, and the hook 100 is adapted to engage the centers of the cables 103 and 104. Springs 105 are screwed to the arms of the spider 101 to throw the upper ends of the hooks 102 outwardly and allow the points 106 of the hooks to move inwardly, so that the spider carrying the hooks will pass freely downwardly into operating position, as shown in dotted lines in Fig. 5. Tension upwardly on the cable 99 will overcome the springs 105 and throw the points 106 of the hooks under the matrix section 4, and continuous upward movement of the cable 99 will raise the matrix section 4 and the movable mold section 2 upwardly, as shown in Figs. 1 and 1ᴬ.

An operating rope 107 is attached at its upper end to the operating pulley 92 and wound upon the pulley in the direction opposite to the winding of the cable 99, and the operating rope 107 extends downwardly to the floor, so that the operator may grasp the rope 107 and pull downwardly on the rope, thereby rotating the operating pulley 92 in one direction and rotating the pulley 91 in the same direction, thereby pulling upwardly on the cable 99 and raising the spider 101 carrying the matrix section 4 and the movable mold section 2 upwardly to any desired height. The pawl 94 will ride over the ratchet wheel 93 and hold the load at any point where operation is stopped. When it is desired to lower the movable mold section and matrix section, the cord 98 is operated to release the pawl 94 from the ratchet wheel 93, and the rope 107 is gradually released and allowed to wind upon the pulley 92 while the cable 99 winds from the pulley 91.

Referring to Figs. 1ᴬ, 2 and 4, rack supporting ears 108 and 109 extend from the stationary mold 1 on the line 21, said ears being located in a plane near the ends of the tube plate 23. Clamp supporting ears 110, 111, 112 and 113 extend from the stationary mold 1 on the same line, said clamp supporting ears being evenly spaced apart and evenly spaced from the rack supporting ears 108 and 109. A tube rack is formed by bending a heavy rod to form the curved central portion 114 and the straight side portions 115 and 116, the lower ends of the side portions 115 and 116 being screw threaded and inserted downwardly loosely through the ears 108 and 109 with a jam nut 117 on top of each ear and a jam nut 118 at the bottom of each ear, so that by tightening the nuts the rack is held rigid and upright. The curved portion 114 of the rack will be above the tube plate 23.

A tube plate clamp 119 is attached to each ear 110, 111, 112 and 113, and each clamp comprises a post 120 inserted downwardly through the ear and having jam nuts 121 and 122 above and below the ear, an arm 123 swiveled upon the upper end of the post 120, a compression screw 124 mounted in the free end of the arm and a pressure foot 125 swiveled upon the lower end of the screw. The arm 123 has a bearing 126 through which the post 120 extends rotatably. A shoulder 127 is fixed rigidly upon the post 120 to support the bearing 126, and a nut 128 is screwed upon the upper end of the post against the bearing 126.

The repaired spot of the inner tube 129 is placed upon the tube plate 23, a block 130 is placed upon the tube over the repaired spot, the arm 123 is swung into position, and the screw 124 manipulated to press the block upon the tube to press the tube against the plate, and during the operation of vulcanizing the tube, the tube is hung upon the rack 114.

It is obvious that the tube plate 23 is an integral part of the stationary mold 1 and that the tube plate will always be hot and ready for use when the mold is in use.

The boiler 131 is preferably cast in a single piece and comprises the central cylindrical portion 132, the downwardly bulging bottom 133, the upwardly bulging top 134, and the female pipe nipples 135, 136, 137 and 138 all cored hollow to make the boiler chamber 139. The object is to make the cast boiler having a homogeneous wall of even thickness and shaped to stand the strain of the heat and steam pressure. A low water test cock 140 is connected through the wall of the cylindrical portion 132 as near the bottom as practical, and a high water test cock 141 is connected through the cylindrical portion 132 near the top. Preferably the nipples 135, 136, 137 and 138 project about an inch beyond the outer face of the cylindrical portion 132. The casing 142 is cylindrical in plan and fits loosely against the outer ends of the nipples 135, 136, 137 and 138, thus leaving a heat chamber 143 between the casing 142 and the cylindrical portion 132 of the boiler. Pipe nipples 144, 145, 146 and 147 are inserted through openings in the upper part of the casing 142 and screwed into the nipples 135, 136, 137 and 138, and the inner pieces of the unions 53, 54, 55 and 56 are screwed upon these nipples so as to connect the stationary mold section 1 rigidly to the boiler, and so as to mount the casing 142 concentric to the boiler and support the casing. A cover 148 fits upon the casing 142 and has central outlets 149 controlled and regulated by a damper 150. A gas burner 151 is mounted in the casing 142 to discharge fire upwardly against the center of the bottom 133 of the boiler.

Thus I have produced a retread vulcanizer adapted to cure a complete retread upon the mold casing at one operation and without the use of a sandbag and clamps.

Especial attention is called to the line of separation between the stationary mold section 1 and the movable mold section 2. The movable mold section 2 fits entirely within the stationary mold section 1 when in operation, and the parting line between the faces 14 and 25 is a vertical line concentric to and parallel with the vertical axis of the mold sections. The stationary mold section 1 is large and strong and has a large steam chamber, so that this stationary mold section will not only heat the lower matrix section 5 but will assist very materially in heating the movable mold section 2 and the upper matrix section 4. The movable mold section 2 is comparatively small and within the heat area of the stationary mold section 1, and will use a comparatively small proportion of the steam.

In the practical operation, I would maintain a steam pressure to show about sixty pounds on the gage 71, and I would crack the blow-off valve 78 sufficiently to blow the water out of the well 77 as fast as it accumulates and a little more, so as to produce a good circulation of steam through the chamber 29. Of course, the condensation produced in the chamber 29 and blown off through the valve 78 is that much water wasted, but there is no practical way that this water can be returned to the boiler. The condensation produced in the steam chamber 15 will return to the boiler through the same pipes that the steam comes from the boiler, and this water will not be wasted.

I consider it of considerable importance that the boiler 131 is mounted concentric to the stationary mold section 1 and connected by four radial pipes of equal lengths, thereby insuring an equal distribution of the steam directly to all parts of the chamber 15. The hose connection between the chamber 15 and the chamber 29 provides a vent for the chamber 15 controlled by the blow-off valve 78.

When the gas burner 151 is of the proper capacity and not too strong the boiler may boil dry and the burner continue to operate indefinitely without injuring anything. The point is that the heavy cast-iron boiler 131 will stand the moderate gas fire indefinitely either when filled with water or when dry.

Various changes may be made without departing from the spirit of my invention as claimed.

I claim:

1. In a vulcanizer, a boiler having radial outlets at its top; pipes extending radially from the outlets; an annular stationary mold section having a steam chamber connected to the outer ends of the pipes and forming the lower half of a tire cavity; a matrix section fitting in the lower half of the tire cavity, so that a tire may be supplied with an inner tube and mounted upon a rim and placed against the matrix section; a second matrix section fitting the tire and fitting the first matrix section; a movable mold section fitting within the stationary mold section against the second matrix section; and means for holding the movable mold section in place, so that the tire may be inflated and vulcanized.

2. In a vulcanizer, a boiler having radial outlets; pipes leading from the radial outlets; an annular stationary mold section mounted horizontally above the pipes and having a steam chamber connected to the pipes, so that steam from the boiler will be distributed to the steam chamber, and so that the condensation will run back to the boiler.

3. In a vulcanizer, a boiler having radial outlets; an annular stationary mold section having a steam chamber with outlets leading from the bottom of the steam chamber; pipe nipples in the outlets of the steam chamber; T's upon the lower ends of the pipe nipples; legs extending downwardly from the T's; and pipe connections between the side outlets of the T's and the outlets of the boiler.

4. In a vulcanizer, an annular stationary mold section mounted horizontally and forming the lower half of a tire cavity; a movable mold section fitting downwardly within the stationary mold section and forming the other half of the tire cavity; a shaft mounted above the mold; a pulley fixed upon the shaft; a cable attached to and wound upon the pulley; a spider connected to the lower end of the cable and adapted to engage the movable mold section; a second pulley fixed upon the shaft; a rope attached to and wound on the second pulley in a direction opposite to the winding of the cable and extending downwardly, so that the spider may be engaged to the movable mold section and the rope pulled to unwind the rope and wind up the cable and raise the spider to separate the mold sections for the removal or insertion of a tire.

5. In a vulcanizer, an annular stationary mold section mounted horizontally and having a steam chamber; a pipe construction extending outwardly and upwardly from the stationary mold section; and an inside core mold fixed upon the upper end of the pipe.

6. In a vulcanizer, an annular stationary mold section forming the lower half of a tire cavity, a boiler having steam pipes radially disposed and connecting with the steam chamber in the mold section, a return tube for condensation connecting the lower part of the steam chamber with the boiler, an annular matrix section fitting in the lower half of the tire cavity, a second matrix section fitting the first matrix section, a movable mold section fitting within the stationary mold section and forming the other half of the tire cavity and fitting the second matrix section, means for steam heating the movable mold section connecting with the boiler, and means for holding the mold sections together to resist the expansion of an inflated tire while the tire is being vulcanized.

7. In a vulcanizer an annular stationary mold section forming the lower half of a tire cavity having a steam chamber, a boiler having steam discharge pipes radially disposed and connecting the top of the boiler with the steam chamber of the mold section, a return tube for condensation connecting the lower part of the steam chamber with the boiler, an annular matrix section fitting in the lower half of the tire cavity, a second matrix section fitting the first matrix section, a movable mold section having a steam chamber and fitting within the stationary mold section and forming the other half of the tire cavity and fitting the second matrix section, a tube connecting through the wall of the movable mold section having its inner end positioned in the lower part of the steam chamber and connected with the boiler for carrying condensation away from the chamber and means for holding the mold sections together.

In testimony whereof I have signed my name to this specification.

EDWARD HARRIS.